US 9,043,285 B2

(12) United States Patent
Bekkerman (10) Patent No.: US 9,043,285 B2
(45) Date of Patent: May 26, 2015

(54) PHRASE-BASED DATA CLASSIFICATION SYSTEM (75) Inventor: Ron Bekkerman, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 393 days.

(21) Appl. No.: 13/369,912

(22) Filed: Feb. 9, 2012

(65) Prior Publication Data
US 2013/0110498 A1 May 2, 2013

Related U.S. Application Data (60) Provisional application No. 61/553,140, filed on Oct. 28, 2011.

(51) Int. Cl.
*G06F 17/30* (2006.01)
*G06F 17/27* (2006.01)

(52) U.S. Cl.
CPC ......... *G06F 17/2745* (2013.01); *Y10S 707/953* (2013.01)

(58) Field of Classification Search
USPC .................. 707/609, 661, 687, 813, 821, 953
See application file for complete search history.

(56) References Cited

U.S. PATENT DOCUMENTS

2012/0179449 A1* 7/2012 Raskino et al. .................. 704/2
2013/0066866 A1* 3/2013 Chan et al. .................... 707/732

* cited by examiner

*Primary Examiner* — Sana Al Hashemi
(74) *Attorney, Agent, or Firm* — Schwegman Lundberg & Woessner, P.A.

(57) ABSTRACT

A method of classifying data is disclosed. Text data items are received. A set of classes into which the text data items are to be classified is received. A phrase-based classifier to classify the text data items into the set of classes is selected. The phrase-based classifier is applied to classify the text data items into the classes. Here, the applying includes creating a controlled vocabulary pertaining to classifying the text data items into the set of classes, building phrases based on the text data items and the controlled vocabulary, and classifying the text data items into the set of classes based on the phrases.

14 Claims, 9 Drawing Sheets

FIG. 1

I(T;C) as a percentage of I(D;C) in the test data of a social networking site plotted over the number of ngrams in T. The ngrams are sorted in the descending order of their frequency.

| | | |
|---|---|---|
| software engineer | trainee software engineer | software engineer |
| software engg | software engineer trainee | software engineer (contractor) |
| sw engineer | sw eng | software engineer (intern) |
| software eng | software engineer | software engineer |
| s/w engineer | consultant software engineer | software engineer/consultant |
| software engineer intern | software engr | sw engg |
| software engineer ii | software engineer i | intern software engineer |
| software engineer | ingeniero de software | software engineer |
| s/w engg | software engineer iv | soft eng |
| software engineer iii | software engineer consultant | software engineer (consultant) |
| software engineering | software engineer (contract) | software engineer in test |
| software engineer | s/w eng | software engineer 2 |
| | | software engineer / consultant |
| | | software engineer co-op |
| | | software engineer |
| | | ingénieur logiciel |
| | | s/w engr |
| | | soft engineer |
| | | soft eng |
| | | software engineer/architect |
| | | software engineer/project manager |
| | | sw engr |
| | | software engineer/developer |
| | | engenheiro de software |

700

A small sample of common ways to specify a job title "Software Engineer" on user profiles.

| Setup | Multiclass SVM trained on: | Partial Match | | | Full Match | | |
|---|---|---|---|---|---|---|---|
| | | Precision | Recall | F-measure | Precision | Recall | F-measure |
| (a) | standardized titles | 91.2% | 83.6% | 87.2% | 80.9% | 65.5% | 72.4% |
| (b) | standardized titles with word translations | 94.0% | 92.1% | 93.0% | 82.4% | 73.6% | 77.8% |
| (c) | most frequent titles | 95.4% | 88.2% | 91.7% | 83.0% | 73.4% | 77.9% |
| (d) | randomly chosen titles | 95.1% | 88.0% | 91.4% | 80.7% | 73.7% | 77.1% |

SVM results on the job title classification task. SVM results may be good on single-class classification (partial match columns), but poor on multilabel classification (full match columns).

PHRASE-BASED DATA CLASSIFICATION SYSTEM

CROSS REFERENCE TO RELATED APPLICATIONS

This application claims the benefit of U.S. Provisional Application No. 61/553,140 filed Oct. 28, 2011, entitled "PHRASE-BASED DOCUMENT CLASSIFICATION SYSTEM," which is incorporated herein by reference in its entirety.

TECHNICAL FIELD

This application relates generally to the technical field of data classification and, in one specific example, to classification of self-descriptive job titles.

BACKGROUND

Various algorithms (or classifiers) are used to classify data, including linear classifiers, support vector machines (SVMs), kernel estimation, neural networks, Bayesian networks, and other classifiers. Metrics for evaluating classifiers include precision, recall (or coverage), receiver operating characteristic (ROC) curves, explainability of classification results, development costs, or maintenance costs. A performance of a classifier may depend on the characteristics of the data being classified. Furthermore, it may be difficult to identify a relationship between the data to be classified and the performance of the classifier.

On a social networking site (e.g., Facebook or LinkedIn), users may manage their own profiles. For example, users may use different forms of natural language (e.g., words and phrases) to describe things that fit into the same category. For example, users of the social networking site may be free to specify their job titles in any form they wish. In a data set of 100 million such job titles, it may not be unusual for users to specify a job title corresponding to a job category (e.g., "Software Engineer") in 40,000 different ways.

For various reasons (e.g., in order to boost revenues earned by the social networking site through targeted advertising), owners (or administrators) of the social networking site may wish to classify their users' self-descriptive job titles (or other user-specified data) into a generated or determined set of categories (e.g., a few dozen categories). For job title classification, examples of such categories may be Engineering, Marketing, Sales, Support, Healthcare, Legal, Education, and so on.

It may be possible to use standard classifiers (e.g., SVMs) to solve such a data classification problem. However, standard classifiers may not solve the problem as effectively as another classifier, such as a classifier that is specifically targeted for the problem, especially in view of a particular set of performance metrics that is selected by the owners or administrators of the social networking site.

BRIEF DESCRIPTION OF THE DRAWINGS

Some embodiments are illustrated by way of example and not limitation in the figures of the accompanying drawings in which:

FIG. 4 is a table illustrating an example of the results of applying an SVM classifier to a job title classification task.

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

We present a data (or document) classification system that employs lazy learning from labeled phrases. The system can be highly effective, such as whenever the following property holds: most of information on document labels is captured in phrases. We call this property near sufficiency. Our research contribution is twofold: (a) we quantify the near sufficiency property using the Information Bottleneck principle and show that it is easy to check on a given dataset; (b) we reveal that in all practical cases—from small-scale to very large-scale-manual labeling of phrases is feasible: the natural language constrains the number of common phrases composed of a vocabulary to grow linearly with the size of the vocabulary. Both these contributions provide firm foundation to applicability of the phrase-based classification (PBC) framework to a variety of large-scale tasks. An example implementation of the PBC system maybe focused on the task of job title classification. Such an implementation may be incorporated, for example, into a data standardization effort of a social networking site. The system may significantly outperform its predecessor both in terms of precision and coverage. The system may be used in conjunction with an ad targeting product or other applications. The PBC system may excel in high explainability of the classification results, as well as in low development and low maintenance costs. In various embodiments, benchmarking of the PBC against other high-precision document classification systems (e.g., using different algorithms) may show that PBC is most useful in multi-label classification.

In various embodiments, a method of classifying data is disclosed. Text data items are received. A set of classes into which the text data items are to be classified is received. A phrase-based classifier to classify the text data items into the set of classes is selected. The phrase-based classifier is applied to classify the text data items into the classes. Here, the applying includes creating a controlled vocabulary pertaining to classifying the text data items into the set of classes, building phrases based on the text data items and the controlled vocabulary, and classifying the text data items into the set of classes based on the phrases.

Figure 1:
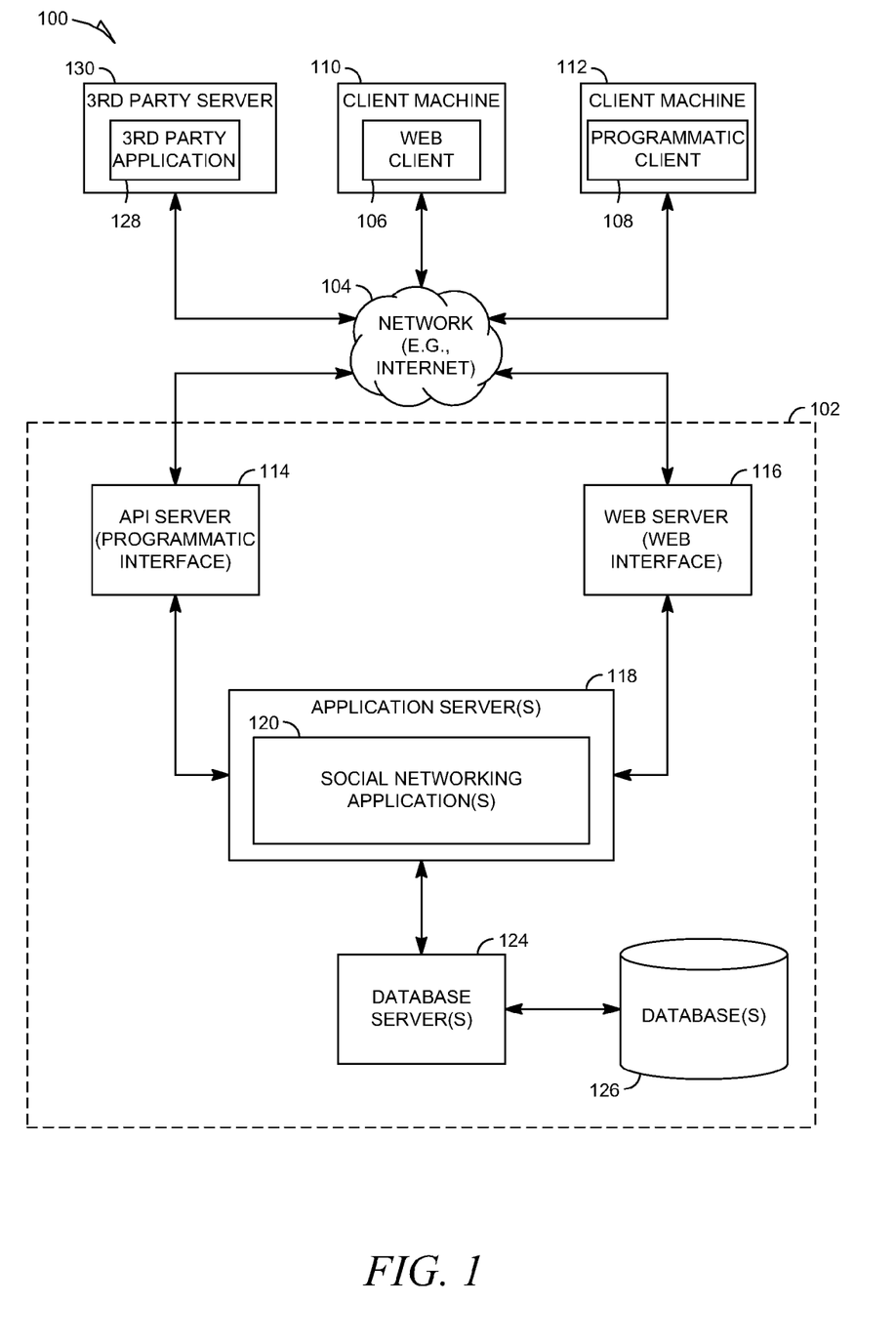
FIG. 1 is a network diagram depicting a client-server system, within which various example embodiments may be deployed.

FIG. 1 is a network diagram depicting a client-server system 100, within which various example embodiments may be deployed. A networked system 102, in the example forms of a network-based social-networking site or other communication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients 106, 108 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more social-networking applications 120. The application servers 118 are, in turn, shown to be coupled to one or more databases servers 124 that facilitate access to one or more databases or NoSQL or non-relational data stores 126.

The social-networking applications 120 may provide a number of social-networking functions and services to users that access the networked system 102. While the social-networking applications 120 are shown in FIG. 1 to form part of the networked system 102, in alternative embodiments, the social-networking applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various social-networking applications 120 could also be implemented as standalone software programs, which do not necessarily have computer networking capabilities. Additionally, although FIG. 1 depicts machines 130, 110, and 112 as being coupled to a single networked system 102, it will be readily apparent to one skilled in the art that machines 130, 110, and 112, as well as applications 128, 106, and 108, may be coupled to multiple networked systems. For example, the applications 128, 106, and 108 may be coupled to multiple social-networking applications 120, such as payment applications associated with multiple payment processors (e.g., Visa, MasterCard, and American Express).

The web client 106 accesses the various social-networking applications 120 via the web interface supported by the web server 116. Similarly, the programmatic client 108 accesses the various services and functions provided by the social-networking applications 120 via the programmatic interface provided by the API server 114. The programmatic client 108 may, for example, perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, social-networking, or payment functions that are supported by the relevant applications of the networked system 102.

Automatic classification of text documents plays a preeminent role in numerous industrial and academic data mining applications. Text classification has been explored for decades, and machine learning techniques have proved successful for a variety of text classification scenarios. In various embodiments, there are four possible text classification setups, as described in the following paragraphs.

Eager learning from labeled documents—the most common setup, in which a generic machine learning classifier is trained on a set of labeled documents.

Lazy learning from labeled documents—a case-based classifier (e.g. k-nearest neighbors) is build based on labeled documents. In various embodiments, this lazy learning setup is fairly rare in the text domain as it is highly inefficient in many practical cases.

Eager learning from labeled features—usually coupled with learning from labeled documents.

Lazy learning from labeled features—an ensemble of decision-stump-like classifiers is constructed, each of which is triggered if a document contains a certain feature, such as a word or a phrase (i.e. an ngram of words). This setup is in the focus of this disclosure-we term it Phrase-Based Classification (PBC). PBC is very natural for multilabel text classification (when each document may belong to a number of classes), as a number of decision stumps may be triggered for a document. Another advantage of PBC is in explainability of classification results, which is an important feature of commercial text classification systems: the fact that a document d is categorized into a class c can be easily explained by the fact that d contains a phrase t that was manually categorized into c.

PBC may not be the ultimate solution for every text classification task. In this disclosure, we characterize the class of tasks in which PBC may be set for success. We introduce the property of near-sufficiency: the information about a document's class label is mostly concentrated in a few ngrams (usually noun phrases) occurring in the document. Intuitively, the near-sufficiency property holds if the categorized documents are short (such as news headlines, helpdesk requests, Twitter tweets, Quora questions, LinkedIn user profile summaries, etc)—just because short documents have little content beyond a few phrases. Still, longer texts can hold this property as well. An example may be to categorize pieces of code according to the programming language this code was written in. Regardless of the code's length, just a few keywords may be enough to reveal the class label accurately.

The field of text classification in general, and PBC in particular, may be affected by at least two factors, as described in the following paragraphs.

A quantum leap in the data scale. The social media boom brings huge amounts of textual content on the daily basis. Blogs, reviews, news feeds, and status updates (such as tweets) are often publicly available and ready for mining. Analyzing hundreds of millions or even billions text items is the modern reality. However, their vast majority may unlabeled and thus intensive manual labeling may often be necessary.

Availability of cheap editorial resources (e.g., crowdsourcing). Companies such as Amazon (mturk.com), Samasource, CrowdFlower, and others provide means for quickly labeling large-scale data. Crowdsourcing can also be used for evaluating classification results. The cost of labeling a data instance can be as low as a fraction of a cent. In various embodiments, the quality of crowdsourcing results may be quite low. Some workers may be underqualified, some simply may not stay in focus for long, and therefore their output may often be noisy and inconsistent. This may cause some frustration among researchers who apply crowdsourcing to text classification. Nevertheless, manual labeling of hundreds of thousands data instances (which was impractical just a few year ago) may now perfectly practical.

In various embodiments, we introduce Phrase-Based Multilabel Classification as a process consisting of the following steps: (a) given a dataset D and a set of classes C, construct a Controlled Vocabulary V of words relevant for categorizing D into C; (b) from the dataset D, extract a set T of frequently used phrases that are composed out of words from V; (c) categorize phrases T into C (e.g., via crowdsourcing); (d) map each document d onto a subset of phrases from T and assign d into a subset of classes based on classification of the phrases. Below, we describe the phrase-based classification in greater details.

Crowdsourcing classification of phrases may have at least two important advantages. First, humans can be very good at categorizing short pieces of text. If properly trained, human annotators can perform the task accurately and fairly quickly-mostly based on their common knowledge. In contrast, to create a common knowledge base in an automatic classification system may be difficult. Second, humans may be much better than machines at multilabel classification. Questions such as "How many classes does a data instance belong to?"" or "Should this data instance be assigned to any class?" maybe relatively easy for a human annotator.

We see at least three potential drawbacks of crowdsourcing classification of phrases. First, crowdsourcing classification may not always be consistent; thus, we may need to apply quite a heavy-lift consistency check on the crowdsourcing results. Second, human annotators may not be able to cope with a large number classes. (However, if the classification is done for a user-facing product, a large number of classes may not be necessary because the end users may not be able to cope with them either.) Third, the number of phrases to be labeled might be overwhelmingly large and infeasible for human annotation, even in a crowdsourcing setup.

Below, we reveal that crowdsourcing classification of phrases may actually be feasible in substantially all practical situations. The natural language may impose a (very restrictive) upper bound on the effective number of phrases which can possibly be composed out of a controlled vocabulary. Based on a language model estimated over a huge text collection, we discover that the effective number of phrases grows linearly—rather than exponentially—in the vocabulary size. Thus, the language model may allow extremely high-precision classification of multimillion document collections that obey the near-sufficiency property.

As an example, phrase-based classification may be applied to the task of Job Title Classification (e.g., on a social networking site, such as LinkedIn). Here, the task may include categorizing job titles of users into a couple of dozen classes according to a job function performed by those titles' holders. Below, we describe an embodiment of the system. This embodiment may dramatically increase precision and coverage in comparison to other systems of job title classification. For example, an offline evaluation shows that we achieve about 95% classification precision. Below, we compare our phrase-based classification system with a Support Vector Machine (SVM) classification system, and show that our method may significantly outperform various SVM versions on a multilabel job title classification task.

The PBC system may be successfully deployed with respect to an ad targeting product. Increasing the coverage may result in increasing the user profile inventory available for targeting, which may have a direct revenue impact on the social networking site.

The sections below can be summarized as follows. First, we formalize the near-sufficiency property of the data that guarantees high-precision phrase-based classification (PBC). Second, we show that PBC will always be feasible, and not shy of dealing with multimillion and potentially billion data instance collections. Last, we present a working use case of phrase-based classification on data associated with a social networking site, and provide insights on building a successful PBC system.

Phrase-Based Classification—Problem Setup

In various embodiments, the problem of multilabel text classification is defined as follows. Each document from an unlabeled corpus D is to be categorized into one or more classes from a class set C. More formally, a rule $L:D \rightarrow 2^C$ is to be learned from training data. Also available is a labeled test set $D_{test}=\{(d_i, C^*_i)\}$, where $|D_{test}|<<|D|$ and each $C^*_i \subset C$ is a set of $d_i$'s ground truth classes. Performance of the classification rule L is evaluated on the test set by comparing each $L(d_i)$ with $C^*_i$. (See also FIG. 2.)

In classic text categorization, the rule L is learned given a training set $D_{train}$ of documents and their labels. However, the categorization framework does not restrict the training set to contain only documents. This disclosure deals with phrase-based classification (PBC)—a text classification framework in which the training data consists of labeled phrases, or ngrams, extracted from the (unlabeled) documents. In this disclosure, the terms "phrase" and "ngram" are used interchangeably.

Feasibility of Phrase Labeling

Since our classification framework is heavily dependent on the manual process, we need to make sure that the process will be manageable in a generic case: the number of ngrams to annotate will not exceed human capabilities. We are only interested in annotating those ngrams that are frequent enough in the language—otherwise we will lose generality of our framework. (Obviously, we can artificially limit the number of ngrams to be labeled. For example, we can take a list of only ten thousand most frequent ngrams. This will hurt the coverage though, as many documents would not be mapped onto any ngram from the list.) Despite that the combinatorial number of all possible ngrams made of words from a vocabulary V is growing exponentially with n (the length of ngram), it is quite obvious that the language will not allow most of them to be frequently used. Let us show that the number of frequent enough ngrams is reasonably small in all practical settings. First, let us explain what we mean by "frequent enough" ngrams.

Definition 2. We define the frequency of a set X to be the frequency of its least frequent item: $F(X)=\min_{x \in X} F(x)$.

We say that a set T consists of frequent enough ngrams if $F(T) \geq F(V)$, i.e. the set of ngrams is as frequent as the vocabulary out of which those ngrams were composed. Here we solely aim at conditioning the frequency of T on the frequency of the controlled vocabulary. We might have imposed a different condition, e.g. $F(T) \geq [F(V)/(\alpha)]$ where $\alpha>1$. This would lead to similar results but make our reasoning more complicated after introducing an extra parameter $\alpha$.

To show that the set T of frequent enough ngrams is feasibly small, we make use of the Web 1T dataset. The Web 1T data was released by Google in 2006. It consists of frequency counts of unigrams, bigrams, trigrams, fourgrams, and fivegrams, calculated over a dataset of one trillion tokens. The data is large enough to be a good model of a natural language. Another example of a dataset that may be good model is the Books ngram dataset. The unigram portion of the Web 1T data consists of about 7.3M words (we lowercased letters and ignored punctuation), with their frequency counts in a range from about $2*10^{10}$ down to $2*10^2$. Needless to say, most of these words are not in our lexicons. In fact, only the upper 50K or so contain words that are in our everyday use.

We preprocessed the data by first omitting ngrams that appeared less than 1000 times in the Web 1T data, removing stopwords and alphabetically sorting words in each ngram (which leads to ignoring the words' order). For example, given a fivegram "of words from the dictionary", we removed stopwords of, from, and the and then alphabetically sorted the remaining words into a bigram "dictionary words". We ended up with about 2.5M (distinct) unigrams, 13M bigrams, 10M trigrams, 4M fourgrams, and 1.4M fivegrams.

To establish the upper bound on the number of frequent enough ngrams, we first ask the question what would be a vocabulary of size k out of which the maximal number of ngrams can be composed. Obviously, this is an NP-hard problem, as we would need to construct $((N_1)$ choose k) vocabularies, where $N_1$ is the number of unigrams in our data. We apply a greedy approximation. Let $T=U(V)$ be the set of ngrams composed out of a vocabulary V, where U is an ngram construction function, provided to us by the natural language. Let $V=U^{-1}(T)$ be the vocabulary out of which the set of ngrams T is composed. First, we take a set T* of all the most frequent ngrams in the Web 1T data, such that $|V^*|=|U^{-1}(T)|=k$, i.e. the underlying vocabulary V* is of size k. Second, we take a set $\hat{T}^*=U(V^*)$ of all ngrams composed of V*, which is as frequent as V* itself, i.e. $F(\hat{T}^*)\geq F(V^*)$. This way, we assure that $T^*\subseteq \hat{T}^*$. The fact that ngram frequencies follow a power law- and that $\hat{T}^*$ contains all the most frequent ngrams-guarantees high quality of our approximation.

Figure 3:
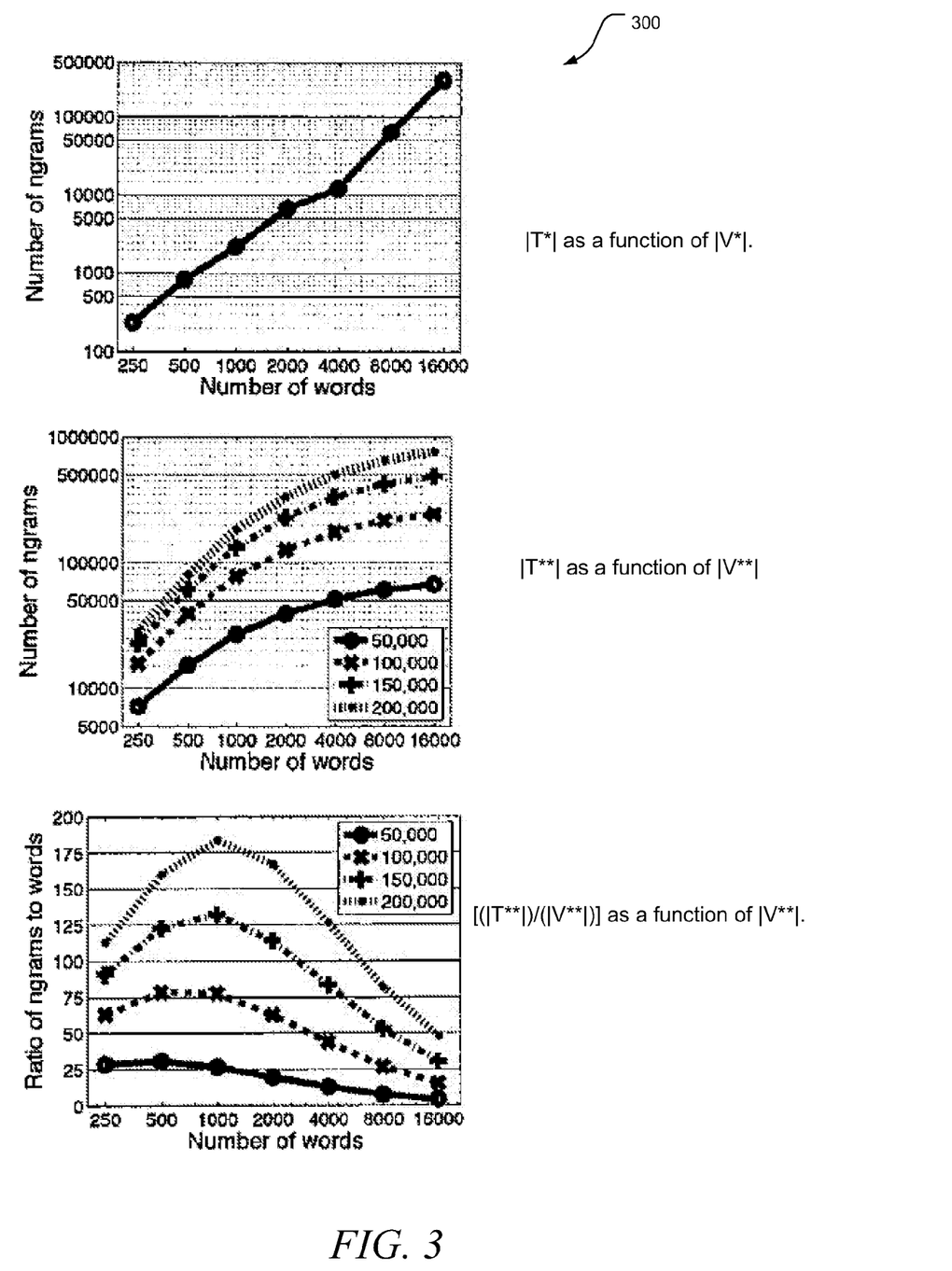
FIG. 3 is a set of graphs illustrating a plotting of $|\hat{T}^*|$ as a function of $|V^*|$, plot $|T^{}|$ as a function of $|V^{}|$, and $[(|T^{}|)/(|V^{}|)]$ as a function of $|V^{**}|$ for a test set of data.

In FIG. 3, we plot $|\hat{T}^*|$ as a function of $|V^*|$. As we can see on the plot, $|\hat{T}|=|V^*|_\beta$, where the exponent β is very small: $1\leq\beta<1.3$. This leads us to the conclusion that the language will only allow a reasonably small number of frequent enough ngrams, to be composed out of vocabularies of reasonably small sizes.

The procedure for creating a vocabulary V* described above is artificial, and quite unrealistic in practice. While this does not matter for establishing the upper bound, we can tighten it if we apply a more natural scenario. We start with an observation that controlled vocabularies are usually built of words that come from the same topic (or a few topics). We simulate the creation of a topic-oriented controlled vocabulary V in the following process: we first sample a word $w_1$ from a multinomial distribution defined over the set $V_m$ of m most frequent words in the Web 1T data. The word $w_1$ plays the role of a seed for the topic of V. Then we add a second word $w_2 \in V_p$, that is most co-occurring with $w_1$, and we add a third word $W_3 \in V_p$, that is most co-occurring with $\{w_1,w_2\}$, and so on until we populate our vocabulary V with k most co-occurring words. (The fact that the words in V highly co-occur with each other assures that V is built around a particular topic which is more realistic than in our previous setup. The fact that the words co-occur as much as possible allows us to establish the upper bound on the number of ngrams composed out of V.) We then build the ngrams $T^{}=U(V^{})$, such that $F(T^{})\geq F(V_m)$–the ngrams are as frequent as the space of words from which V was built (note that $F(V_m)\leq F(V^{**})$). To overcome the non-determinism of seeding the topic, we repeat the process 10 times and report on the mean and standard error. (The standard error is too small to be visible on our plots.)

We probe various sizes k of the controlled vocabulary, from 250 to 16,000 words. This spans over arguably the entire spectrum of possibilities, as a set of 250 words appears to be too small for a high-quality controlled vocabulary, while a set of 16,000 is larger than the entire lexicon of an average language speaker. We also probe different values of m—the number of most frequent words from which V** is built. We tried four values of m: 50K, 100K, 150K, and 200K. We argue that the utility of using m>200K is very low, as words in the tail of that list are completely obscure, and therefore useless from the generalization point of view.

Figure 2:
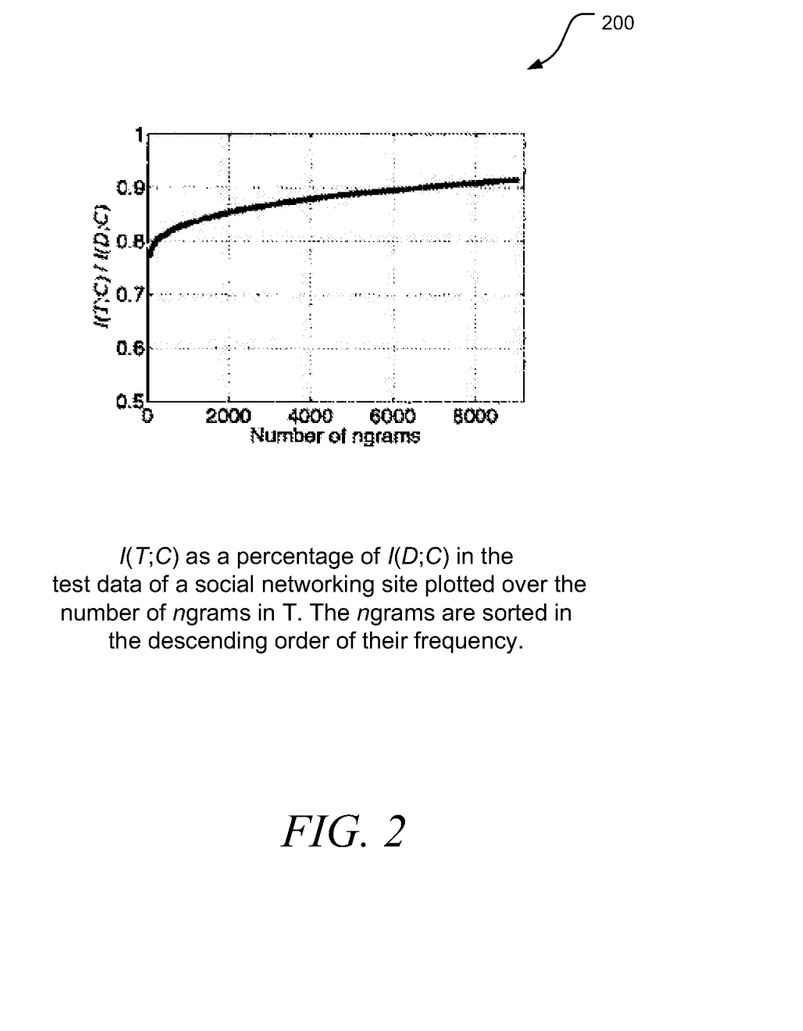
FIG. 2 is a graph illustrating I(T;C) as a percentage of I(D;C)

Our results are shown in FIG. 2. We plot $|T^{}|$ over $|V^{}|$ and see that it looks curvy on the log-log scale, which may imply that the number of ngrams is no longer super-linear in the number of underlying words. To verify this claim, we expose an additional view of the same data: we plot $\gamma=[(|T^{}|)/(|V^{}|)]$ over $k=|V^{**}|$, and show that $\gamma<200$ for all realistic values of k and m, which leads to the following formal result:

Corollary: The natural language imposes a linear dependency between the number of words in a controlled vocabulary V and the number of frequent enough ngrams composed out of words from V.

We observe an interesting saturation effect on the right plot: for large vocabularies (k>1000), the γ ratio decreases. We can explain this as follows: high-frequency words are well represented in vocabularies of any size. Low-frequency words, however, are mostly represented in large vocabularies. Ngrams that contain lower-frequency words are even less frequent-they fall below our threshold, which leads to fewer ngrams in T** per word in V.

One could argue that since the Web 1T data does not contain frequencies of high-order ngrams (above fivegrams), then the data is not complete and no conclusion can be made on the overall number of frequent enough ngrams composed out of words in V. While the data is not complete indeed, we are confident that it contains enough information to let us reason about the total size of T. FIG. 3 justifies our claim.

Figure 4:
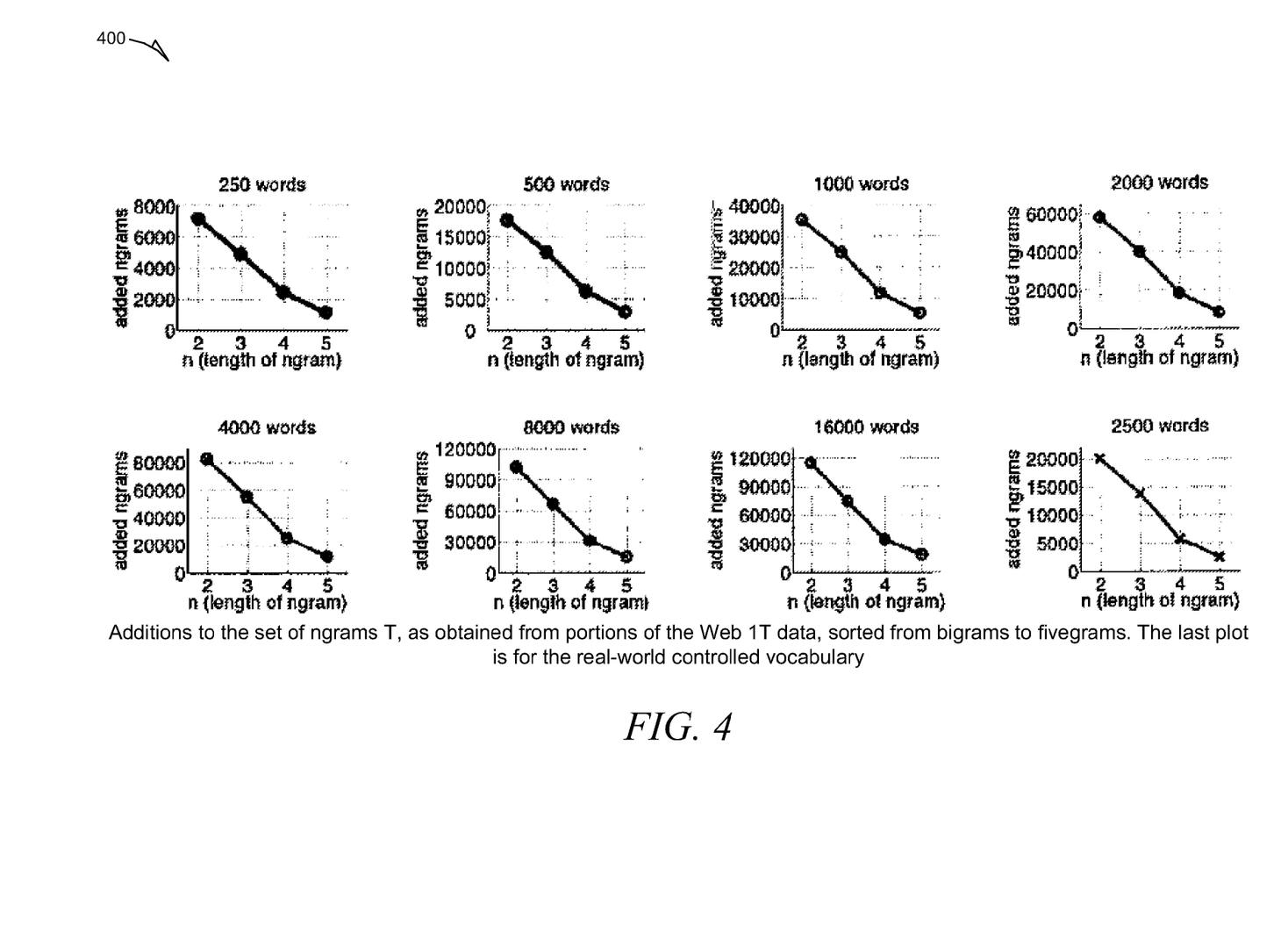
FIG. 4 is a set of graphs illustrating a plotting of a number of ngrams added in comparison to a length of ngrams over multiple processing steps.

FIG. 4 illustrates an example 400 of a number of ngrams added after every processing step: first, after scanning Web 1T bigrams, then after scanning trigrams, then fourgrams and fivegrams. As we see from the plots, the number of ngrams to be added goes down dramatically as the ngrams' order goes up. It can be easily explained by the fact that the probability of an ngram to be frequent enough decreases exponentially with the ngram's length. As the number of added ngrams is already small at the fivegram landmark, we do not anticipate a significant addition to the total size of T that would come from higher-order ngrams.

The first seven of the eight plots in FIG. 3 show the ngram addition data over the same values of k as in FIG. 2. The last, eighth plot shows an example of a real-world V of size 2500—the one described below—with the frequency constraint $F(U(V))\geq F(V)$. While the curve behaves very similarly to the previous seven curves, the overall number of ngrams is about 3-4 times lower, as compared to the artificial setups with k=2000 and k=4000. This implies that our upper bound is actually not very tight.

Example Architecture of a Phrase-Based Classification System

Figure 5:
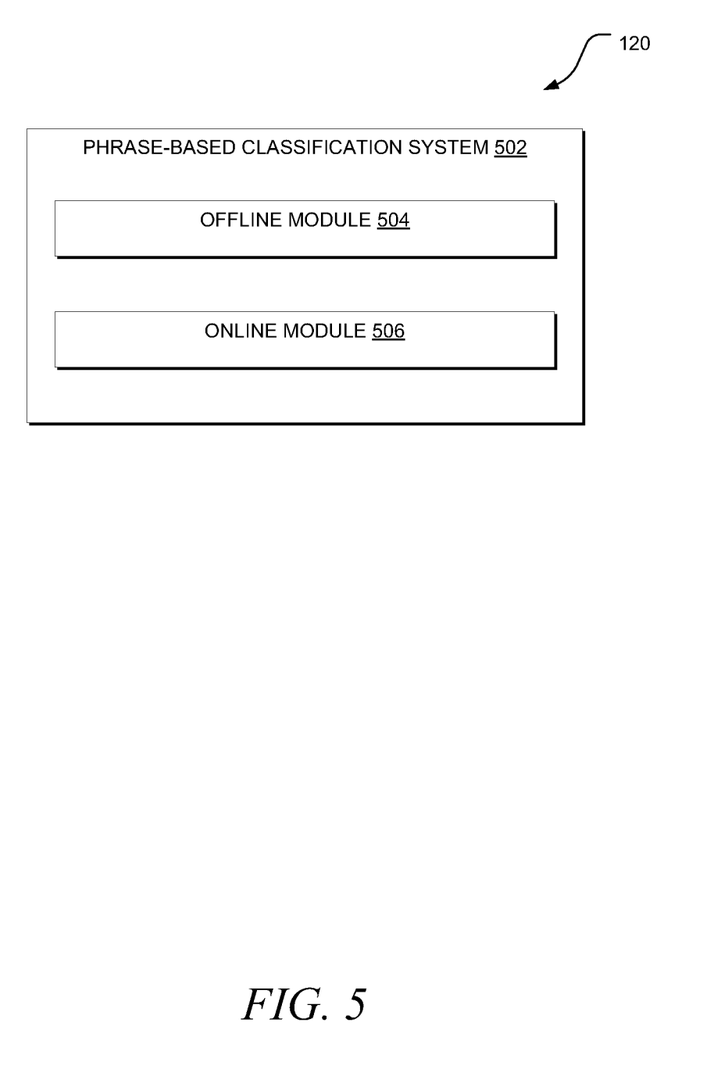
FIG. 5 is a block diagram illustrating an example embodiment of a system for phrase-based classification.

FIG. 5 illustrates an example embodiment of a system 502 for phrase-based classification, which may achieve very high precision and may outperform popular classification methods. The system is composed of two modules: offline module 504 and online module 506. The offline module 504 aims at constructing and labeling phrases which are then used in the online module for categorizing documents. Clearly, the online module 506 is optimized for throughput such that most of the heavy data processing is done in the offline module.

Offline Process of Phrase Classification

Figure 6:
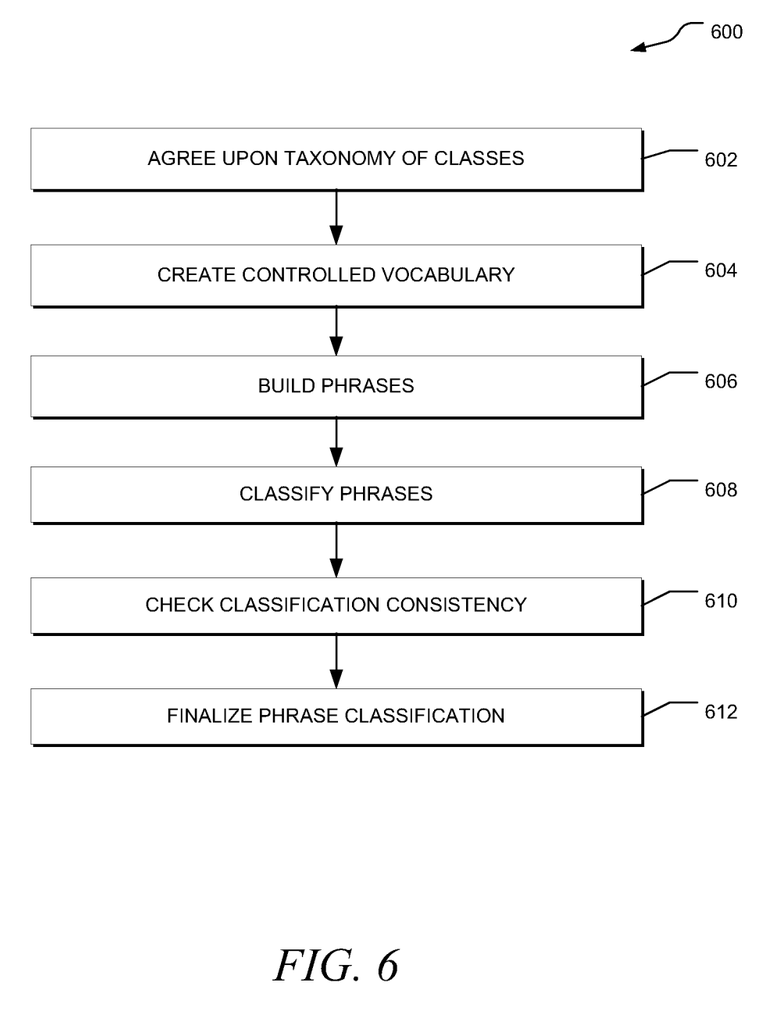
FIG. 6 is a flow chart illustrating an example method of offline phrase classification.

FIG. 6 illustrates an example method 600 of offline phrase classification. The method may be implemented by the offline module 504 of the phrase-based classification system. Let us walk through the operations included in the example method 600 one-by-one.

Agree 602 upon the Taxonomy of Classes C. Each classification system that is built in response to a particular business need in a commercial organization starts with defining the taxonomy of classes. Any text corpus can be categorized into a variety of class taxonomies, however not all of them fit well the data at hand. If our data consists of, say, people's job titles, but our classes are models of Japanese cars, then we will fail to meet the system's coverage requirement. A good taxonomy may be constructed in a negotiation between business and technology groups within the organization. Note that, in various embodiments, the success of this step as well as most of the next steps may not be achieved without the involvement of a Content Manager-a domain expert who is in charge of keeping the data organized and presented in the best possible way. In alternative embodiments, the success of this step may not depend on the involvement of a Content Manager; for example, this step may be performed by various additional modules of the system.

The next step in the process is to Create 604 a Controlled Vocabulary V of words that are supposed to characterize classes in the taxonomy. Controlled vocabularies are routinely used in computational linguistics to investigate particular language patterns, as well as in library science to organize and index knowledge. In our case, the creation of a controlled vocabulary is a semi-manual feature selection process where, at first, words in the dataset are sorted in the descending order of their frequency, and then the content manager scans through the sorted list and uses his/her domain expertise to decide whether a word can be included or not. Tools can be built to improve productivity of this work, given a particular task at hand.

Once the controlled vocabulary is created, the next step is to Build Phrases T. We are only interested in ngrams of words from V that frequently reappear in the data (rare phrases are useless from the generalization point of view). We ignore the order of words in phrases, so that, for example, text classification and classification (of) text will be considered the same phrase. (One may argue that in some cases the order of words is actually crucial, e.g. Paris Hilton and Hilton, Paris are not the same. However, those cases are rare from the statistical point of view, and therefore for all practical purposes words' ordering can be ignored in text classification.) Above, we proved that the language will not let the set T be too large for manual labeling. The process of building the set T can be fully automatic: (a) extract all phrase candidates from the data D; (b) sort them by frequency; (c) cut off the least frequent ones. We have to take care of the issues discussed in the following paragraphs Filter out compound phrases. We can use NLP techniques (such as shallow parsing), to identify phrases that are frequent enough, but are clearly composed of two (or more) stand-alone phrases. For example, a phrase "Machine Learning or Information Retrieval" can be frequent enough, but keeping machine learning and information retrieval in one phrase might distract our annotators, who may make an arbitrary decision whether the phrase belong to one class, two classes, or none.

Filter out too specific phrases. Some phrases, such as, e.g. "Content-Based Collaborative Filtering", can be frequent enough in the data but too specific for an annotator to understand their meaning. It makes more sense to remove such phrases given that a more general phrase (i.e. collaborative filtering, in this example) is in T.

Filter out near duplicate phrases. Some phrases, such as "Recommendation System" and "Recommender System", are practically identical—not only in their form but also in their meaning. We may use Levenshtein distance to identify those pairs and then reason whether one of them can be mapped on the other. Some help from the content manager may be needed with this task.

Now, when we have a feasible number of phrases, we can Crowdsource Phrase Classification. Crowdsourcing sounds simple but it may not actually be simple. A straightforward approach would be to submit the task to a crowdsourcing tool, asking the workers to assign each phrase into zero, one, or more classes from the predefined set C. (Despite that we do not preserve words' ordering in the phrases, we need to present them to annotators in the form that is most commonly used in our data.) If priced properly, the task will be done quickly but chances are strong that the results will be unsatisfactory (in some cases, practically random). The voting mechanism (i.e. let a number of workers annotate each phrase and then take the majority vote) does not seem to help much as the mode sometimes emerges from a seemingly uniform distribution. The mechanism of qualification tests (which a worker needs to pass in order to take the task) is helpful though. The best results are achieved when (a) trust is established between the requester and every worker; and (b) every worker is well educated about the task to be performed.

As a byproduct of the classification process, workers can detect nonsensical phrases, as well as undesired words in the controlled vocabulary. Their feedback can be plugged back into the system and necessary changes can be made.

Even when the workers are well trained for the task, the results are likely to have two issues: systematic errors and consistency errors. A systematic error occurs when the majority of workers make the same incorrect decision. Systematic errors are hard to discover and fix. One way to reduce the systematic error rate is to choose workers of different backgrounds and geographic locations, and use the voting mechanism. Fortunately, systematic errors are not very common.

Consistency errors are more common, but also easier to tackle. A consistency error occurs when one choice is made for an item, and a different choice for a similar item. Consistency errors occur even when the voting mechanism is used. When the consensus of voters is weak, it is often enough for a single worker to make an inconsistent choice, in order to introduce a consistency error. To dramatically reduce the consistency error rate, it is desirable for each worker to perform the entire task. This increases the systematic error rate, but-again-those are quite rare. Even when each worker performs the entire task, consistency errors are common, primarily because people do not remember all the choices they have made. Another approach to reduce the consistency error rate is to present the workers with sets of similar items. Even then, the results are rather inconsistent.

This observation leads us to the next step in the pipeline: Check Classification Consistency. We represent each phrase t as a feature vector over the aggregated Bag-Of-Words of all documents mapped onto t. This representation is supposed to be dense enough for machine learning to be applied. If it is still too sparse, we can make use of additional data, such as, e.g., documents hyperlinked from our dataset D (e.g. shared links in tweets, etc).

Once represented as a feature vector, each phrase passes a consistency check, which utilizes a simple k-nearest neighbors (kNN) model: each phrase $t_i$ is assigned to a class $c_i^{knn}$ based on the class majority vote of its neighbors in the ector space. Whenever $c_i^{knn} \in C_i$ where $C_i$ is a set of classes obtained for $t_i$ via the manual classification, we consider the classification to be consistent. A more interesting case is when $c_i^{knn} \notin C_i$. Crowdsourcing the task of deciding between $c_i^{knn}$ and $C_i$ is unlikely to produce good results, as people are bad at choosing between two legitimate options. (It may not be unusual for as many as 200 workers asked to take a test of 20 such cases to fail to pass a 75% accuracy barrier.)

We use an SVM model as the judge. We train it on the consistently categorized phrases and apply it to the unresolved cases. Since SVM model is fundamentally different from the kNN model (one is eager learning, another is lazy learning), we believe that the two models are unlikely to produce a systematic error. If the SVM judgement $c_i^{svm}$ falls within $\{c_i^{knn}\} \cup C_i$, we go with the SVM result. If not, we declare the case too difficult and leave $t_i$ uncategorized.

By this, we approach the last step of the pipeline: Finalize Phrase Classification. Even after such an elaborated error detection process, some problems may remain in the phrase classification results. It turns out however that spot-checking the existing classification results is a much easier task for a human than coming up with the original classification. The content manager can do a good job of fixing last issues by simply scanning through the created phrase classification. Of course, not all the issues can be detected this way. However, this process can go on long after the classification system is deployed. Given that the phrase classification task is by no means large-scale, it has the potential of eventually converging to the 100% precision.

Online Process of Document Classification

The online part of the PBC system is to map each document to a subset of phrases from T, and then the document classes are obtained by a simple look-up of classes of the corresponding phrases. Since the set of phrases T was created out of most common phrases in the data D, many documents from D will be mapped onto at least one phrase. The mapping process is fully automatic, and fairly similar to the process of creating T. For each document $d_i$, we (a) extract controlled vocabulary words $V_i = V \cap d_i$; (b) given $V_i$ construct all possible phrases $T_i \subset T$; and (c) filter some irrelevant phrases if any. The latter step would also incorporate some shallow NLP, for example, if the document is "Text Analytics and Image Classification", then we must not map it onto the phrase text classification. Note that before we start the mapping process, we need to perform some preprocessing, such as taking care of word misspellings and abbreviations—to be mapped onto their full, correct form.

Another important aspect of the document-to-phrases mapping is that we would prefer mapping documents onto the most specific phrases available (filtering in the offline process prevents us from getting too specific). For example, if a document is mapped onto three phrases: text, classification, and text classification, then we would choose the more specific phrase (text classification) and filter out the others. This is done because the more specific the phrase is, the more precise decision the annotator can make.

Job Title Classification System

Figure 7:
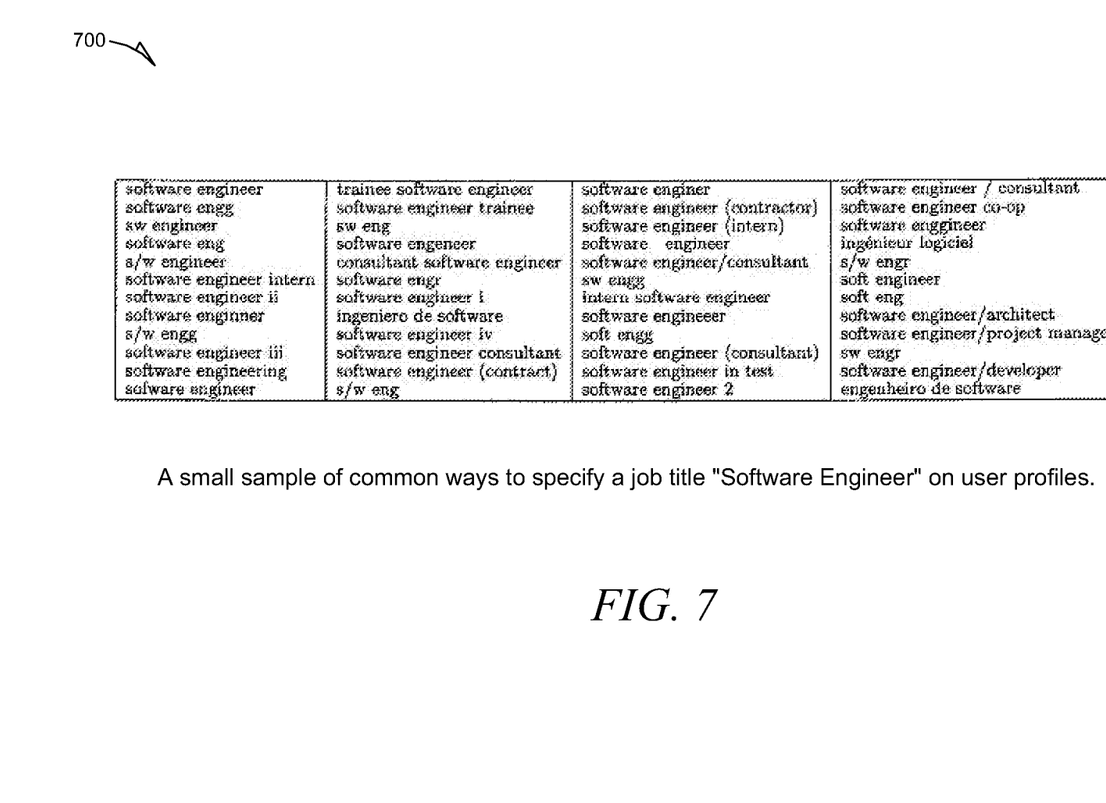
FIG. 7 is a table illustrating a sample of common ways in which the job title corresponding to the category "Software Engineer" is specified by users in their profiles on a social networking site.

Our use case for testing the proposed PBC methodology is classification of users' job titles at a social networking site. On their professional profiles, users of the social networking site may be free to specify their job titles in any form they wish. In various embodiments, we found almost 40,000 different ways in which users specified a title "Software Engineer". FIG. 7 illustrates a few very common cases. (We did not include various subgroups of software engineers, nor software developers/programmers, in this count.)

A example task we describe here is to categorize the job titles into a few dozens of classes according to job functions. Examples of the classes can be Engineering, Marketing, Sales, Support, Healthcare, Legal, Education, etc. For the offline module (phrase classification), we may use a dataset of about 100M job titles. Obviously, many of the titles repeat in the data, especially those generic titles such as "Manager", "Director" etc. After we lowercase all titles and identify duplicates, we create a dataset of unique titles which may turn out to be about 5 times smaller than our original dataset. Let us first discuss the offline part of our PBC implementation.

Agree upon Taxonomy of Classes. The set of classes was provided by the business owner which we accepted.

Create Controlled Vocabulary. There are three most important types of words in job titles: (a) job names, such as engineer, president, comedian etc; (b) seniority words, e.g. senior, junior, principal; and (c) function words, such as sales, research, financial etc. Seniority words are the smallest bucket; function words are the largest bucket. Altogether, our controlled vocabulary consists of about 2500 words. Also, we create a translation look-up table, where abbreviations, common misspellings, and foreign language words are translated into the controlled vocabulary words.

Note that classification of foreign titles is quite straightforward because our domain is very narrow: simple word-by-word translation usually creates a meaningful English phrase that annotators can successfully categorize. Two corner cases that we may need to take care of are translation of one word into multiple words (typical in German), and translation of multiple words into one word (typical in French).

Build 606 Phrases. Titles get cleaned by filtering out words that do not belong to our controlled vocabulary, and applying translations. Following our recipe described in more detail below, we split compound titles (such as "Owner/Operator"), get rid of too specific titles, and deduplicate the resulting list. We then select a few dozens of thousands most common cleaned titles to be our set of phrases (we called them standardized titles). Examples of standardized titles are software engineer, senior software engineer, software developer, java programmer etc. We verify that the list of standardized titles was comprehensive enough to cover the spectrum from very common to relatively rare titles.

Classify 608 phrases. Classification of the standardized titles is another step in the project. It may be important for us to perform the job with the highest possible precision, so we may not to outsource it. Instead, we may chose the annotators to be employees of the social networking site. To reduce a possible systematic error, we may need to hire annotators of diversified backgrounds. Together with that, we may need to minimize the effort of educating and training our annotators, so we may organize them in groups. We create two groups of annotators in two separate geographic regions, and ask each annotator to label the entire set of standardized titles. After the task is completed, we apply the voting mechanism. A certain percentage (e.g., 15%) of the standardized titles may not gain the majority vote (e.g., no class may be chosen for those titles by the majority of annotators). We then perform two rounds of disambiguation to reach a consensus classification of every standardized title in the list.

Check 610 Classification Consistency. As described in more detail below, we apply the kNN model. We may find that a certain percentage (e.g., 25%) of the standardized title classifications are not consistent with the kNN model results. We may then apply the SVM model as a judge and resolve most of the inconsistency cases. We may leave uncategorized the cases when SVM produced a result that differs from both the kNN result and the original manual classification result.

Finalize 612 Phrase Classification. The process of finalizing the standardized title classification may be important for the success of the project. Spot-checking may reveal a number of systematic errors and consistency errors. After the classification gets finalized, the new challenge is to evaluate the standardized title classification results. We may not use our annotators for evaluating their own work. Therefore, we may hire a different group of annotators to evaluate the classification results. This different group of annotators may evaluate a certain percentage (e.g., 25%) of the standardized title classifications and estimate the classification precision (e.g., 98%).

The online process of mapping original titles onto the standardized titles is fairly simple. For each original title, we first apply word translations and filter out words that did not belong to our controlled vocabulary. Out of the remaining words, we compose all possible standardized titles from our list. We then apply three NLP heuristics to get rid of problematic mappings. For example, we avoid mapping a compound title "Senior Engineer/Project Manager" onto a standardized title senior project manager. We also remove generic mappings if more specific ones were available. For example, if a title is mapped onto both senior software engineer and software engineer, we remove the latter. The resulting mapping may achieved a percentage of coverage (e.g., more than 95% coverage) on our dataset (e.g., of about 100M titles).

A challenging task may be to evaluate the precision of the mapping. We may use one of the commercial crowdsourcing providers for this task. The provider may evaluate a large set of mappings, where the evaluation set of original titles is sampled from the original title distribution (such that more common titles have a higher probability to get selected). In embodiments in which there is a high level of duplications in our data, the evaluation set may cover a subset (e.g., about 40%) of all titles in our dataset. The evaluation may estimate the mapping precision (e.g., at 97%).

Given the precision of standardized title classification (e.g., 98%), the lower bound on precision of the overall (original job title) classification process may be determined by multiplying the classification precision with the mapping precision (e.g., 97%*98%=95%). It is a lower bound because an original title can be incorrectly mapped onto a standardized title that happens to belong to the same class as the original title. The overall precision may then be analyzed to determine whether the classification process achieves our precision goals. The coverage may also be analyzed. In various embodiments, particular coverage goals may not be met. For example, many standardized titles (usually generic ones, such as "Manager") may not have an appropriate class in C. Obviously, coverage does not only depend on the system but also on the data and the taxonomy of classes, which makes the coverage goals rather vulnerable. Higher coverage may be achieved either by introducing new data classes, or by mapping the input data to more specific phrases-those that can be categorized.

Comparison with SVM

A legitimate question is how well would the traditional text classification tools cope with the problem of job title classification. In various embodiments, after applying PBC classification, we may have an order of a hundred million job titles categorized with 95% precision. We can use any portion of this data to train a classifier and compare its results with those we obtained with PBC.

We use the SVM classifier for this comparison. Note that SVM is not a strawman—it is one of the best classification models available, particularly well suited for text. We set up a multilabel SVM framework. For example, we use SVMlight with parameters c=0.1 and j=2, which are chosen based on our prior knowledge.

We train an SVM on a portion of the job title data, then test it on the entire data and compare the classes assigned by the SVM with the classes assigned by PBC. If the SVM is within the 90 percentile from PBC, we can say that the document-based classification results are comparable with the phrase-based classification results. However, if the SVM results are farther from those of PBC, we can claim that the SVM does a poor job (given that PBC is 95% accurate).

We propose two quality measures of the classification results: a tolerant and an aggressive:

Partial Match. For each data instance $d_i$, we choose a single class $c_i^{svm}$ that has the maximal confidence score among those obtained by one-against-all binary classifiers. Note that the maximal score can actually be negative. Then we consider d, to be successfully categorized if $c_i^{svm} \in C_i$ (i.e. if $c_i^{svm}$ is among classes assigned by PBC). In this setup, we apply k+1 binary classifiers, where the extra classifier is for "No Class"—we compose an artificial class of instances that PBC did not assign to any class.

Full Match. For each data instance $d_i$, we build a set $C_i^{svm}$ of classes that have positive confidence scores. We then consider d, to be successfully categorized if $C_i^{svm}=C_i$ (i.e. SVM classes and PBC classes are identical). In this setup, we do not need an extra class for "No Class".

We used the standard Precision, Recall, and F1 measures in both setups, as obtained on the entire data D, besides instances that were not covered by PBC. Note that this way the SVM is evaluated on both the training and testing data simultaneously—and it is a rare case when this is not a problem: since we start from scratch (no labeled data is initially provided), it does not matter which instances are categorized manually and which automatically, as soon as the results can be fairly compared. And we achieve fair comparison by training the SVM on the same number of instances as were manually labeled in the PBC process.

We tested four options for applying SVMs: (a) train on the set of standardized titles T, and test on D while taking into account only features from T, that is, only our controlled vocabulary V; (b) the same, but apply the word translation lookup table, for mapping some extra features of data D onto V; (c) train on the most common titles in D; (d) train on titles sampled from the title distribution over D. The reason for choosing those options was that, in traditional text classification, option (d) would be the default one, option (c) could be plausible, but options (a) and (b) would not be available. Our goal is to see whether the domain knowledge provided in V and the translation table can improve the SVM classification results.

Figure 8:
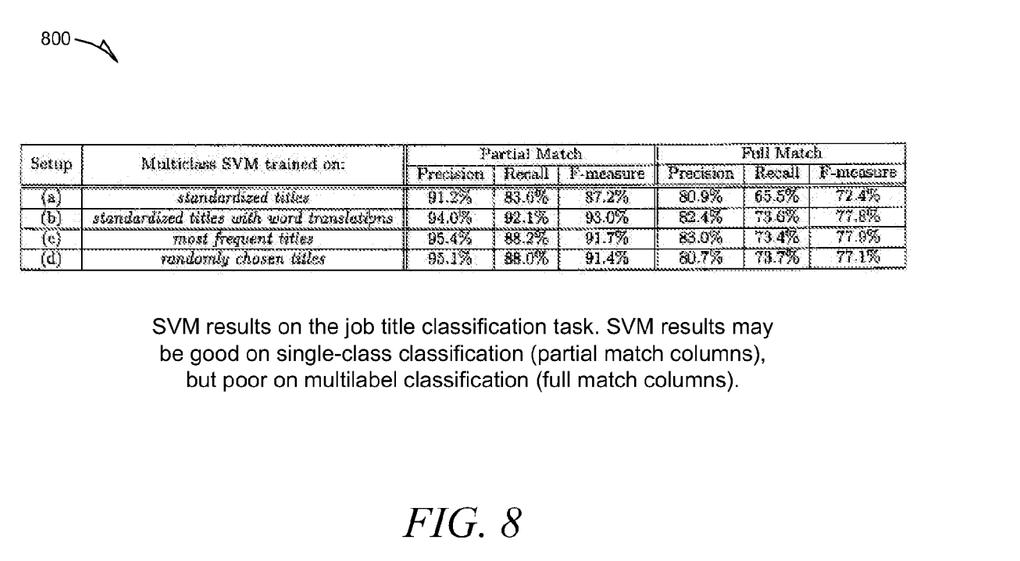

FIG. 8 illustrates an example summary 800 of findings. The Partial Match results may be very good, which proves again that the SVM classifier is strong. The Full Match results may be much poorer. They suggest that SVMs are not able to identify all the classes an instance can belong to, while phrase-based classification copes with this problem very gracefully. Among the four training options, option (a) turned to be the worst one, which can be easily explained by the fact that T (without word translations) had the minimal number of features among the four setups. However, whenever word translations got added (option (b)), this setup became the leader, which suggests that the domain knowledge is helpful for SVM classification. Options (c) and (d) performed remarkably similarly, which was rather predictable, given that sampling from the title distribution (option (d)) would heavily prefer most common titles (option (c)).

Thus, we show that phrase-based classification (PBC) can achieve extremely high precision (e.g., 95%) with reasonable coverage (e.g., 80%) on a large-scale text collection (e.g., of over 100M instances). We characterize the class of data on which PBC can be successful (the data that satisfies the near-sufficiency property), and prove that PBC will be feasible on data of virtually any size. The natural language may prevent the annotation task from being overwhelmingly large. The development cost of our deployed PBC system may be low (e.g., 2 person years plus annotation expenses), and so is the maintenance cost (which boils down to periodically updating the controlled dictionary as well as the pool of categorized phrases). In various embodiments, within half a year of no maintenance, the coverage of our job title classification system may decrease by only a certain percentage (e.g., by 0.3%), which shows its sustainability. Overall, the classification framework that can be directly applied to other tasks, with success guaranteed.

An advantage of the deployed system may be in the right use of human labor: domain expertise of the content manager combined with common knowledge of the crowd is leveraged in intuitive, single-action tasks such as "choose a word", "categorize a phrase", and "check a phrase/category pair".

We note that crowdsourcing is not a panacea, and is actually a much more complex task than it would have expected. Without a consistency check, the crowdsourcing classification results may be rather poor. Consider our job title classification use case, for which we hired two groups of annotators. Since we now have all final results, we can see how well each group did as compared to the final results. In various embodiments, it turns out that one group achieved 73.2% F-measure in the Full Match setup (see Section 6), while the other group achieved 76.7% F-measure. Together they achieved 79.3% F-measure. This implies that the two-step consistency check contributed over 20% to the F-measure, bringing success to the entire framework.

Figure 9:
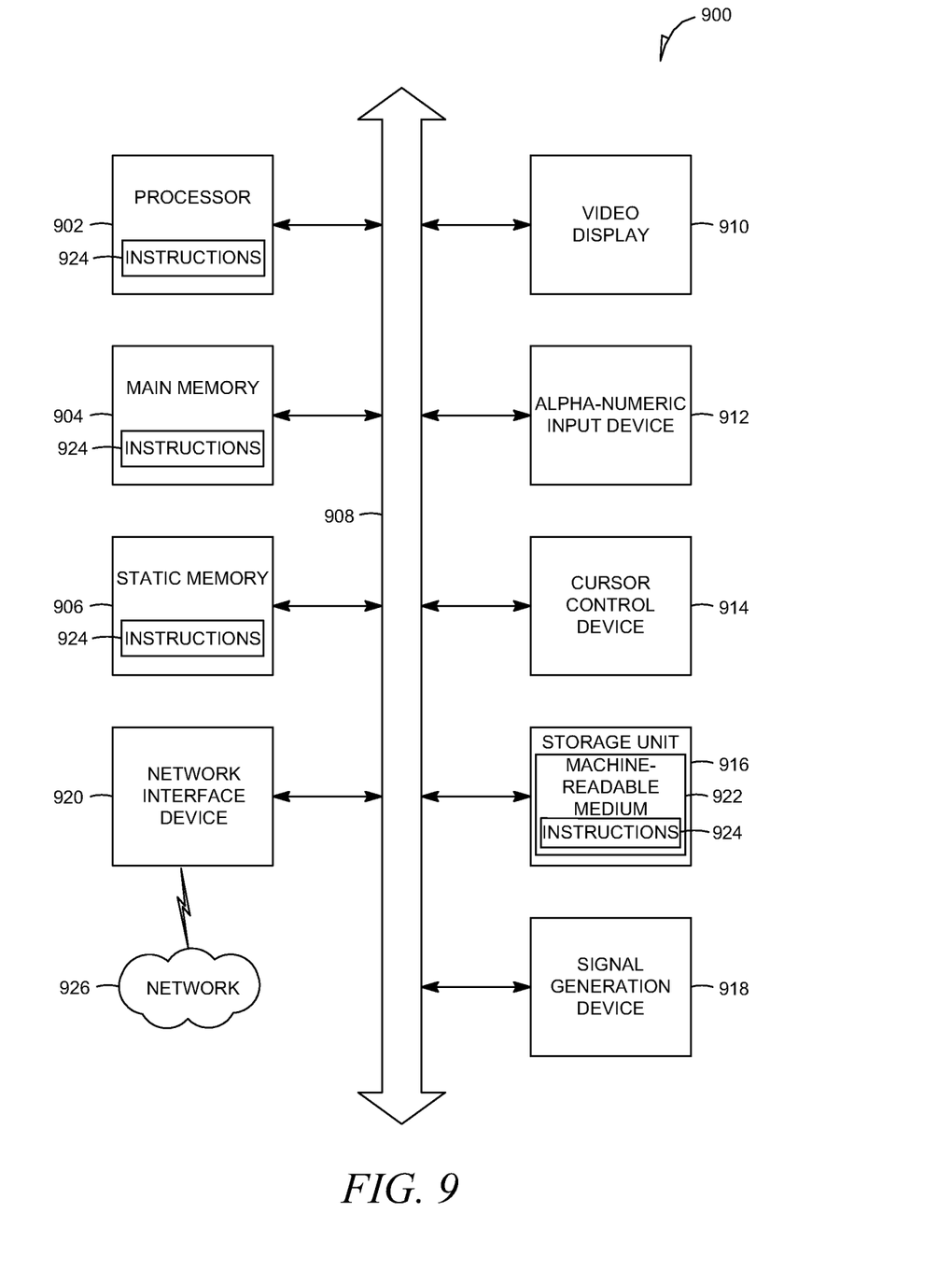
FIG. 9 is a block diagram of a machine in the example form of a computer system within which instructions for causing the machine to perform any one or more of the methodologies discussed herein may be executed.

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The network 926 may be one of the networks 920. The instructions 924 may be transmitted using the network interface device 920 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
  receiving text data items;
  receiving a set of classes into which the text data items are to be classified;
  selecting a phrase-based classifier to classify the text data items into the set of classes; and
  applying the phrase-based classifier to classify the text data items into the classes, the applying including:
    creating a controlled vocabulary pertaining to classifying the text data items into the set of classes;
    building phrases based on the text data items and the controlled vocabulary;
    classifying, using at least one processor, the text data items into the set of classes based on the phrases; and
    reclassifying a text data item of the text data items into the set of classes based on a consistency error.

2. A system comprising:
  at least one processor; and
  a data classification system implemented by the at least one processor and including:
    an online module configured to:
      receive text data items;
      receive a set of classes into which the text data items are to be classified;
      select a phrase-based classifier to classify the text data items into the set of classes; and
      apply the phrase-based classifier to classify the text data items into the classes, the applying including:
        receiving a set of classes into which text data items are to be classified;
        creating a controlled vocabulary pertaining to classifying the text data items into the set of classes;
        building phrases based on the text data items and the controlled vocabulary; and
        classifying the text data items into the set of classes based on the phrases; and
        reclassifying a text data item of the text data items into the set of classes based on a consistency error.

3. A non-transitory machine readable medium embodying a set of instructions that, when executed by a processor, cause the processor to perform a method, the method comprising:
  receiving text data items;
  receiving a set of classes into which the text data items are to be classified;
  selecting a phrase-based classifier to classify the text data items into the set of classes; and
  applying the phrase-based classifier to classify the text data items into the classes, the applying including:
    creating a controlled vocabulary pertaining to classifying the text data items into the set of classes;
    building phrases based on the text data items and the controlled vocabulary; and
    classifying, using at least one processor, the text data items into the set of classes based on the phrases; and
    reclassifying a text data item of the text data items into the set of classes based on a consistency error.

4. The method of claim 1, the applying further comprising reclassifying a text data item of the text data items into the set of classes based on a systematic error.

5. The method of claim 1, the applying further comprising evaluating a precision of the classifying of the text data items.

6. The method of claim 1, the selecting of the phrase-based classifier being based on the text data items being self-descriptive of an attribute of the users of the social networking site.

7. The system of claim 2, the applying further comprising reclassifying a text data item of the text data items into the set of classes based on a systematic error.

8. The system of claim 2, further comprising evaluating a precision of the classifying of the text data items.

9. The system of claim 2, wherein the online module is configured to select the phrase-based classifier based on the text data items being self-descriptive of an attribute of the users of the social networking site.

10. The non-transitory machine readable medium of claim 3, applying further comprising reclassifying a text data item of the text data items into the set of classes based on a systematic error.

11. The non-transitory machine readable medium of claim 3, applying further comprising evaluating a precision of the classifying of the text data items.

12. The method of claim 1, wherein the attribute is a job title.

13. The system of claim 9, wherein the attribute is a job title.

14. The non-transitory machine readable medium of claim 3, the selecting of the phrase-based classifier being based on the text data items being self-descriptive of an attribute of the users of the social networking site.

* * * * *